Aug. 27, 1935.  S. B. FEATHERSTON  2,012,871
SHIELD OR PROTECTOR
Filed Aug. 9, 1933
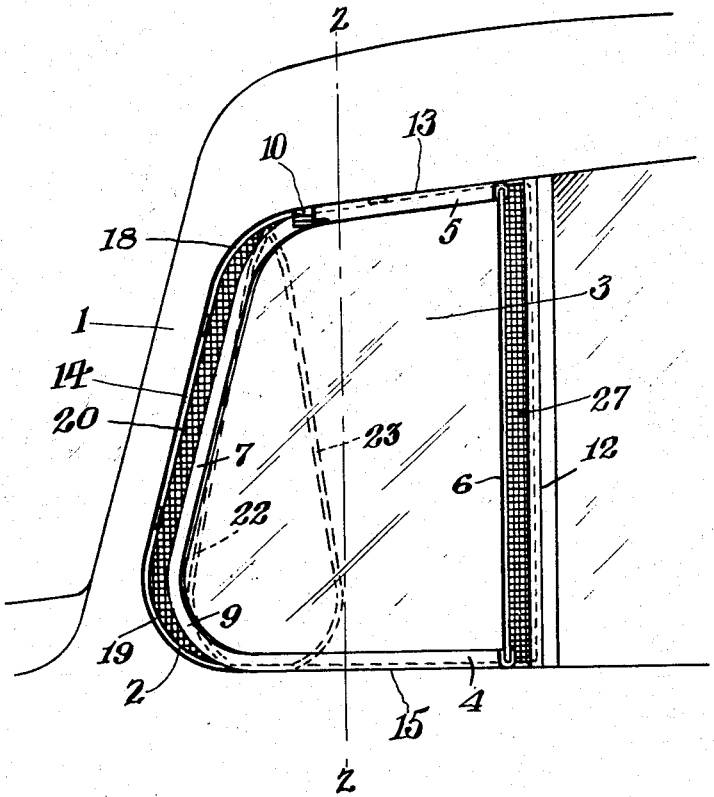
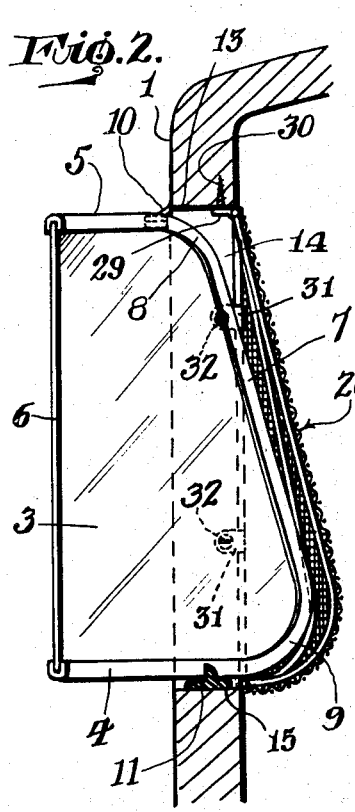
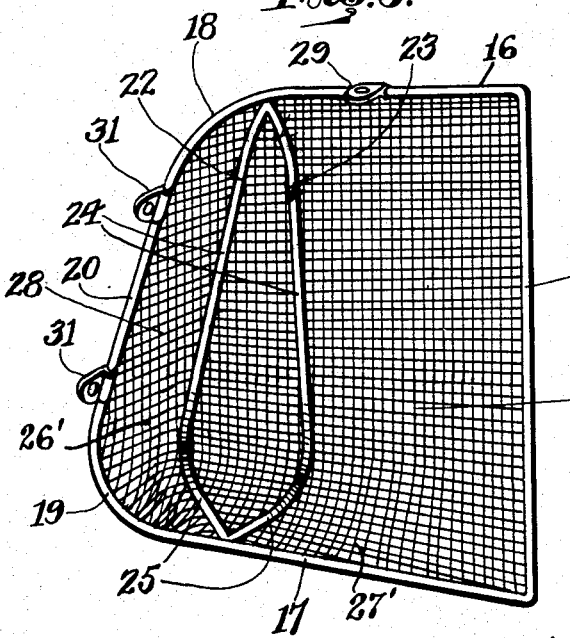
Inventor
Steve B. Featherston
By Geo. P. Kimmel
Attorney Patented Aug. 27, 1935

2,012,871

UNITED STATES PATENT OFFICE 2,012,871

SHIELD OR PROTECTOR

Steve B. Featherston, Lexington, Ky.

Application August 9, 1933, Serial No. 684,430

4 Claims. (Cl. 156—14)

This invention relates to a shield or protector designed primarily for use in connection with individually controlled no-draft ventilators now generally employed on the doors and windows of automobile bodies, and the invention has for its object to provide, in a manner as hereinafter set forth, a device of the class referred to capable of being readily installed in operative position with respect to the ventilator and acting to protect the occupant or occupants of an automobile from bugs, flies or other insects, at any time, more particularly at night when driving or when the vehicle is standing still, and further so constructed whereby when installed relative to the ventilator it will not interfere with the shifting movement of the latter during adjustment.

A further object of the invention is to provide, in a manner as hereinafter set forth, a reticulated device of the class referred to including means for connection to walls of the opening in which is arranged the ventilator, and with said means acting to suspend the body of the device in an inwardly directed manner from said opening and acting when so suspended to prevent the passage of bugs, flies or other insects through the opening into the body of the vehicle.

A further object of the invention is to provide, in a manner as hereinafter set forth and for the purpose referred to a shield or protector capable of being installed within an automobile body without changing or damaging the latter in any manner.

Further objects of the invention are to provide, in a manner as hereinafter set forth, a shield or protector for the purpose referred to which is simple in its constuction and arrangement, strong, durable, compact, light in weight, thoroughly efficient in its use, expeditiously installed and removed when desired, and comparatively inexpensive to manufacture.

To the above ends essentially and to others which may hereinafter appear, the invention consists of such parts, and such combination of parts which fall within the scope of the invention as claimed.

In the drawing:

Figure 1 is a fragmentary view in side elevation of an automobile body with a side of the latter provided with a ventilator and further showing the adaptation of the shield or protector in co-relation with respect to the ventilator opening.

Figure 2 is a section on line 2—2 Figure 1.

Figure 3 is a perspective view looking towards the outer face of the shield or protector.

Referring to the drawing, I denotes the body of an automobile provided with a ventilating opening 2 which is regulated and closed by a ventilator 3 of that type commonly known in the automobile industry as no-draft ventilators.

The ventilator 3 is of substantially triangular form having its bottom edge 4 of greater length than its top edge 5. The rear edge 6 of ventilator 3 is straight and its forward edge 7 inclines forwardly from its top to its bottom. The upper and lower forward corners of ventilator 3 are rounded, as at 8, 9 respectively. The opening 2 conforms in contour to that of ventilator 3. The latter is pivotally supported from body 1 as at 10, 11. The top edge 5 inclines slightly downwardly from front to rear. The walls of opening 2 are indicated at 12, 13, 14 and 15. The construction referred to is well known and in general use.

The shield or protector includes a frame of substantially triangular form. The frame consists of a top bar 16, a bottom bar 17, front oppositely curved corner portions 18, 19, a front bar 20 and a rear bar 21. The bar 16 at its front merges into the portion 18 and the latter terminates in the upper end of bar 20. The bar 17 at its front merges into the portion 19 and the latter terminates in the lower end of bar 20. The rear ends of bars 16 and 17 merge respectively into the upper and lower ends of bar 21. The bar 16 is of less length than bar 20 and inclines downwardly from its rear to its front. The bar 20 inclines forwardly from the forward end of portion 18 to the forward end of portion 19. The forward end of bar 17 is extended forwardly with respect to the forward end of bar 16. The bar 17 is of greater length than bar 16.

The shield or protector also includes a pair of oppositely disposed brace bars 22, 23 which have the portions or stretches 24 thereof oppositely inclined from their upper ends in a direction away from each other. The portions 24 are also inclined from their upper ends in an inward direction away from one side and with respect to the upper end of the frame. The bars are further formed with portions or stretches 25, are inclined from their upper ends in opposite directions toward each other and also curved in a direction toward the bottom of the said side of the frame. The upper ends of the portions 24 merge into each other and are connected to the corner portion 18. The lower ends of the portions 24 merge into the upper ends of the portions 25. The lower ends of the portions 25 merge into each other and are connected to the bottom frame bar 17 in proximity to the forward end of the latter.

The portions 24 of bars 22, 23 are of greater length than the portions 25 of said bars. The bar 22 is arranged forwardly of bar 23. The parts 24, 25 of the bars are termed respectively upper and lower portions.

Secured to and throughout the outer faces of the bars 16, 17, corner portions 18, 19, bars 20 and 21 is a reticulated member 26 which bears against and is braced outwardly by the bars 22, 23. The bars 22, 23 coact with the member 26 to provide the latter with a part 26' extending rearwardly from bar 20 at an outward inclination, an upstanding part 27 inclining outwardly from its upper end with respect to bar 16 and an upwardly extending part 27' inclining away from bar 17. The parts 26', 27 and 27' coact to provide a cavity or pocket 28 forming a clearance for the forward end of ventilator 2.

The top bar 16 intermediate its ends is formed with a laterally extending apertured ear 29 for positioning against the inner face of the wall 13 of opening 2. Extending through ear 29 is a hold-fast device 30 for detachably anchoring bar 16 to the body 1. The front bar 20 is provided with a pair of spaced apertured laterally extending ears 31 for positioning against the wall 14. Extending through the ears 31 are holdfast devices for detachably anchoring the bar 20 to body 1. The ears 29, 31 and holdfast means 30, 32 coact to anchor the shield or protector suspendingly across the inner end of the opening 2, and extending inwardly from such end.

When the device is in the position shown in Figures 1 and 2 it prevents the entrance of bugs, flies and insects into the automobile when the ventilator is open, permits of the ventilator being shifted to open and closed positions and does not interfere with ventilation of the vehicle.

What I claim is:—

1. A protector for use in connection with the ventilator opening for an individually controlled no-draft pivotally mounted ventilator on an automobile body comprising an upstanding frame for positioning within the ventilator opening inwardly of the ventilator, a pair of upstanding bracing bars having their ends connected to the top and bottom of the frame at the forward portion of the latter, said bars being formed with oppositely inclined upper portions extending away from each other from their upper ends and being inclined in a direction away from said frame from their upper ends, said bracing bars being formed with oppositely disposed lower portions inclined in a direction toward each other from said upper ends and extended upon a curve from their upper ends directed toward the bottom of the frame, the upper ends of said lower portions merging into the lower end of said upper portions, and a reticulated member secured to and throughout the front, top, rear, and bottom of said frame and tightly bearing against and throughout one face of said bars, said member providing a screen for the ventilator opening and coacting with said bars to provide it with a part extending inwardly at an inclination from the front end of the frame, an upstanding part inclining throughout from its upper end away from the frame and a part extending inwardly and upwardly from the bottom of the frame, said parts coacting to provide a pocket to receive the front end of the ventilator when the latter is shifted to extend through the opening.

2. A protector of the construction set forth in claim 1 combined with laterally disposed apertured means for positioning within the ventilator opening and for the passage of holdfast devices to anchor the protector stationary.

3. A protector of the construction set forth in claim 1 whereby the upper portions of the bracing bars are of greater length than the lower portions of said bars.

4. A protector of the construction set forth in claim 1 whereby the frame gradually decreases in height from its rear to its front and having its front rearwardly inclined from the bottom to the top of the frame, and laterally disposed apertured means carried by the top and front of the frame, said apertured means for extension outwardly from the frame into the ventilator opening and providing for the passage of holdfast devices to anchor the protector stationary.

STEVE B. FEATHERSTON.